March 30, 1965 R. B. DERR 3,175,882
PRODUCTION OF ALUMINUM FLUORIDE
Filed Dec. 19, 1961
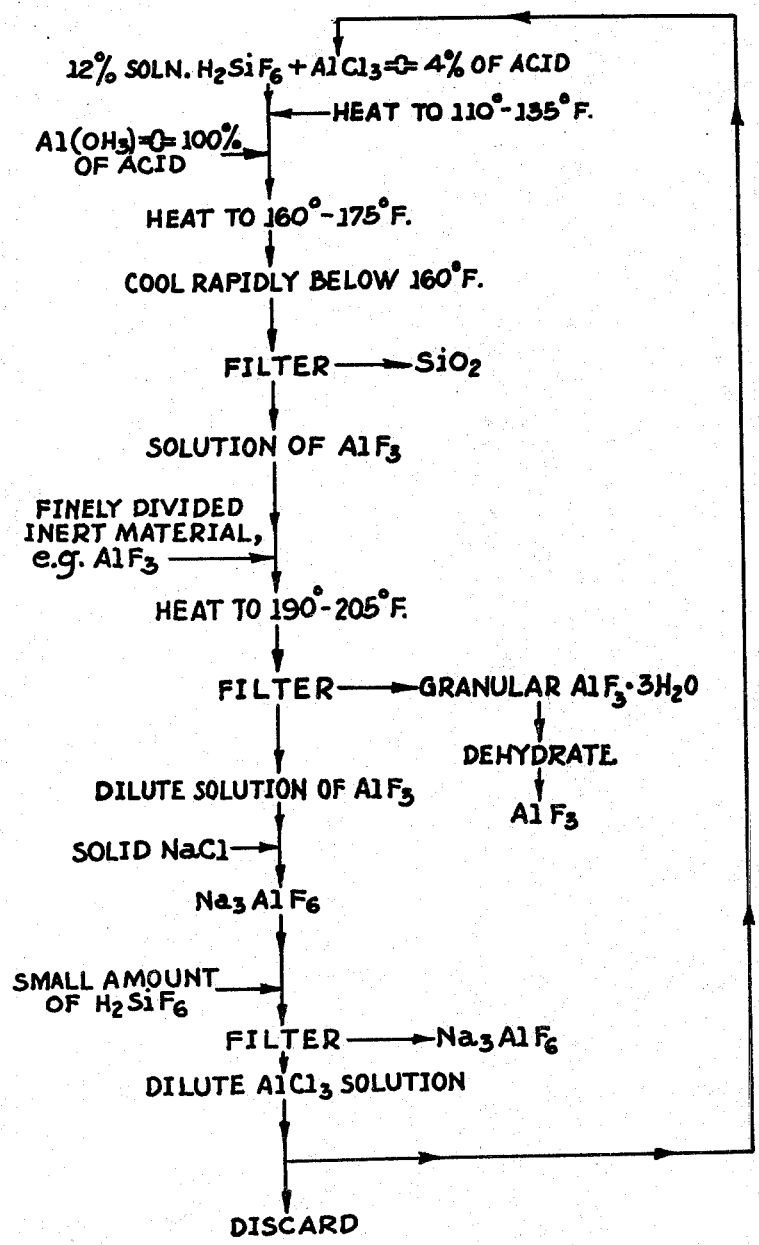
INVENTOR.
RALPH B. DERR.
BY Brown, Critchlow, Flick & Peckham
his ATTORNEYS.

United States Patent Office 3,175,882
Patented Mar. 30, 1965

3,175,882
PRODUCTION OF ALUMINUM FLUORIDE
Ralph B. Derr, 354 Hunt Road, Pittsburgh 15, Pa.
Filed Dec. 19, 1961, Ser. No. 160,528
12 Claims. (Cl. 23—88)

This invention relates to the production of aluminum fluoride ($AlF_3$) from an aluminous material and a fluorine-containing acid, and also, in a particular embodiment the production of cryolite as a by-product ($Na_3AlF_6$).

It has been known for many years that aluminous materials containing alumina, such as aluminum hydrate, bauxite, and the like will react with fluorine-containing acids to form aluminum fluoride ($AlF_3$) and silicic acid [$Si(OH_4)$] or silica ($SiO_2$), if the aluminous starting material contains silicon in combined form, according to the following reaction in which the alumina is the trihydrate and the acid is hydrofluosilicic acid:

$$Al_2O_3 \cdot 3H_2O + H_2SiF_6 \longrightarrow 2AlF_3 + Si(OH)_4 + 2H_2O \quad (1)$$
$$\text{Soluble} \qquad \text{Insoluble}$$

It is well known also that Reaction 1 between those materials occurs readily at temperatures above about 150° F., and that the rate of reaction increases with increasing temperature. Moreover, it has been recognized that the soluble aluminum fluoride initially formed by Reaction 1 undergoes a secondary reaction in which the soluble aluminum fluoride combines with water to form an insoluble aluminum fluoride trihydrate ($AlF_3 \cdot 3H_2O$) according to the reaction:

$$AlF_3 + 3H_2O \longrightarrow AlF_3 \cdot 3H_2O \quad (2)$$
$$\text{Soluble} \qquad \text{Insoluble}$$

Reaction 2 proceeds more rapidly as the reaction temperature is increased. Consequently, in the past it has not been possible to complete the first reaction and separate the resultant soluble aluminum fluoride from insoluble silicic acid, or silica, before the second reaction has proceeded to an extent such as to entail to an objectionable extent loss of both alumina and fluorine, along with the insoluble silica, in the form of the insoluble aluminum fluoride trihydrate.

One means proposed for avoiding this loss of alumina and fluorine due to Reaction 2 is that disclosed in U.S. Patent Number 2,842,426 which describes a procedure in accordance with which it is sought to obtain high recovery of soluble aluminum fluoride by correlating reaction time and temperature with the concentration of the aluminum fluoride in solution. The data given in that patent show that under the conditions stated in it the loss of fluorine is between 10 and 15 percent while the loss of alumina approaches 20 percent, both based upon the original reactants.

A primary object of the present invention is to produce aluminum fluoride from aluminous materials and fluorine-containing acids of the group consisting of hydrofluoric acid and hydrofluosilicic acid in the operation of which Reaction 1, productive of soluble aluminum fluoride, is accelerated, while Reaction 2, which results in conversion of the soluble to the insoluble form of aluminum fluoride, is inhibited whereby it becomes possible to separate the soluble aluminum fluoride of the first reaction from the concurrently produced insoluble silica and other insoluble impurities concomitant with the starting materials, which is simple, easily practiced with standard equipment, efficient and economical, and which results in higher yields of aluminum fluoride and higher recovery of total fluorine than have been obtained through earlier practices.

A further object is to provide a method in accordance with the foregoing object in which Reaction 1 is carried out in the presence of a soluble aluminum salt, other than the fluoride, such as alumium chloride, that exerts a catalytic or pseudo-catalytic action in accelerating solution of alumina and its conversion to soluble aluminum fluoride while being regenerated at the same time. The shortened reaction time and the residual aluminum chloride-HCl combine to minimize the loss of alumina and fluorine as insoluble aluminum fluoride trihydrate.

Yet another object is to provide a process in accordance with the foregoing objects by which the solution of soluble aluminum fluoride is separated from insoluble impurities, such as silica, and is then converted to the insoluble aluminum fluoride trihydrate which is recovered, as by filtration, with production of a mother liquor containing a small amount of soluble aluminum fluoride which is then reacted with a soluble sodium salt to form insoluble cryolite and a dilute solution of the aluminum salt used as an accelerator in the initial reaction and which may be recycled for that purpose.

Yet another object is to produce substantially pure aluminum fluoride not only from aluminum hydrate but also from low iron aluminous sources such as low iron clays, low iron kaolin, low iron bauxite, and other low iron ores or minerals containing alumina in combined form that is reactive with fluorine-containing acids while avoiding the disadvantages and losses of prior procedures.

Other objects will appear from the following specification.

The invention will be exemplified with reference to the accompanying flow sheet illustrative of its preferred embodiment.

In the practice of the invention there may be used any low iron aluminous material reactive with fluorine-containing acids such as hydrofluoric acid (HF) or hydrofluosilicic acid ($H_2SiF_6$); the latter is preferred because it is inexpensive and available in large quantities as a by-product in comparison with HF, for which reason it will be referred to as exemplifying the invention. Mixtures of the two may be used.

Aluminum hydrate ($Al_2O_3 \cdot 3H_2O$), such as that of the Bayer process, is preferred because of its ready availability in a state of high purity, and thus it may be taken to describe the invention in detail. However, other aluminous materials of the types just stated are utilizable in the practice of the invention.

The invention is predicated in large part upon my discovery that by reacting the aluminous material and the fluorine-containing acid in the presence of a soluble salt of aluminum, other than the fluoride, Reaction 1 is accelerated with concurrent regeneration of that salt in a sort of catalytic action.

More in detail, in the practice of the invention there is first added to the $H_2SiF_6$ a soluble aluminum salt other than the fluoride, suitably aluminum chloride ($AlCl_3$) or aluminum sulfate [$Al_2(SO_4)_3$]. Using $H_2SiF_6$ of, for example, 20 percent concentration it is preferred to add from 2 to 5 percent of the alumina, in the form of the soluble salt, required to combine with $H_2SiF_6$ although higher proportions, even to 25 percent, are not harmful.

There is then added aluminum hydrate substantially equal to the amount necessary to react with $H_2SiF_6$ so that the total alumina is of the order of 2 to 5 percent in excess of that necessary to combine with the $H_2SiF_6$.

The soluble aluminum salt combines with the fluosilicic acid as, for example, by the following reaction:

$$2AlCl_3 + H_2SiF_6 + 4H_2O = 2AlF_3 + Si(OH)_4 + 6HCl \quad (3)$$

The hydrochloric acid formed by the above reaction dissolves alumina, e.g., as aluminum hydrate, vigorously; therefore the alumina, added as aluminum hydrate, bauxite or the like low iron aluminous compound, is attacked by hydrochloric acid in accordance with the following reaction:

$$Al_2O_3 \cdot 3H_2O + 6HCl = 2AlCl_3 + 6H_2O \quad (4)$$

The aluminum chloride formed in Reaction 4 immediately combines with fluosilicic acid as in Reaction 3 to form additional $AlF_3$, $Si(OH)_4$ and HCl. The aluminum chloride being thus converted to hydrochloric acid and back to aluminum chloride may be said to behave as a catalyst. Thus it could be considered that the major portion of the $H_2SiF_6$ is reacted in this manner. In other words, both hydrochloric acid and hydrofluosilicic acid dissolve aluminum hydrate and Reactions 1, 3, and 4 proceed concurrently with the result that the aluminum hydrate is more rapidly dissolved and the desired end products, soluble aluminum fluoride and insoluble silicic acid, are formed more rapidly than if all of the aluminous material were dissolved according to Reaction 1 by fluosilicic acid alone.

The foregoing reactions occur slowly at temperatures below about 150° F. but more rapidly at higher temperatures. In this invention it is preferred to heat the solution containing fluosilicic acid and aluminum chloride (or other soluble aluminum salt other than the fluoride) to about 110° F. to 135° F. depending on the concentration. When the aluminum hydrate is added the heat of reaction rapidly increases the temperature to at least about 160° F. Preferably the solution is brought to about 160° F. and suitably from 165° F. to 175° F., or even higher, e.g., 190° F., heat being supplied if needed. Under these conditions the fluorine in the fluosilicic acid is converted to soluble aluminum fluoride usually within a period of about 15 to 30 minutes and the silica is concurrently rendered substantially insoluble together with any related impurities. The reaction is complete more rapidly at higher temperatures, e.g., 5 to 7 minutes at 190° F.

The presence of aluminum chloride or hydrochloric acid accelerates the formation of soluble $AlF_3$ but inhibits the formation of insoluble aluminum fluoride trihydrate; however continued exposure of the aluminum fluoride solution to temperatures above about 160° F. will allow some precipitation of insoluble aluminum fluoride trihydrate, as per Reaction 2. As a further means of preventing the formation of the insoluble aluminum fluoride trihydrate, I have found, and this is an important factor of the invention, that the digest be cooled as rapidly as possible to below about 160° F., or at least not be permitted to exceed about 160° F., whereby to substantially prevent the formation of insoluble aluminum fluoride trihydrate. Although this cooling may be accomplished by the addition of water, or in other ways, as by exposing the digest to coils through which refrigerant is circulated, I prefer to dump the digest into a dilute cool solution of aluminum chloride which supplies some additional highly reactive alumina which thus assures complete decomposition of any residual fluosilicic acid.

The insoluble silicic acid, or silica, may then be filtered off under practical commercial conditions. The filtrate contains substantially all of the aluminum fluoride in soluble form and aluminum chloride and/or hydrochloric acid.

I now treat the above filtrate to recover the $AlF_3$ free from $SiO_2$ and other insoluble impurities, preferably in the manner set forth in U.S. Patent 1,797,994 in accordance with which a finely divided inert material is added to the aluminum fluoride solution which is then heated to a temperature preferably between about 190° to 205° F. Small amounts of $AlF_3$ suffice for this purpose because it acts as seed for the $AlF_3$ in solution. The finely divided material which is preferably alumina, aluminum fluoride, or aluminum fluoride trihydrate acts as a seed on which aluminum fluoride trihydrate is deposited from solution onto the seed and results in a granular aluminum fluoride trihydrate which may be readily filtered. Under the conditions of that patent, 85 percent of the aluminum fluoride in solution can readily be converted to the insoluble form of aluminum fluoride trihydrate. This insoluble aluminum fluoride is then filtered and dehydrated to produce commercially pure aluminum fluoride.

A further part of my invention deals with the recovery of the fluorine which remains in the filtrate after the removal of about 85 percent of the fluorine as aluminum fluoride trihydrate. The concentration of aluminum fluoride residual in the filtrate is of the order of about 2 percent $AlF_3$. It would not be economical commercially to evaporate this dilute solution to recover this fluorine. However, sodium fluoride combines with soluble aluminum fluoride to form cryolite according to the following reaction:

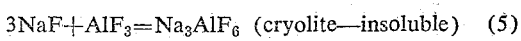

$$3NaF + AlF_3 = Na_3AlF_6 \text{ (cryolite—insoluble)} \quad (5)$$

Sodium fluoride in solid form is too costly for use in recovering aluminum fluoride from such dilute solutions. Sodium fluoride in liquid form could be obtained at low cost from fluosilicic acid for addition to the dilute aluminum fluoride solution. However, sodium fluoride is soluble to the extent of only about four parts in 100 parts of water and this requires such large volumes of solution as would make the cost of recovering cryolite in this manner prohibitive.

I have found, and the invention is in part predicated on this, that when a low cost soluble sodium salt, such as sodium chloride or sodium sulphate, hydrated or not, is added in crystalline, i.e., solid state, form to the dilute aluminum fluoride solution, suitably at 150° to 212° F., the salt first dissolves and reactions occur as follows:

$$2AlF_3 + 3NaCl = Na_3AlF_6 + AlCl_3 \quad (6)$$

or

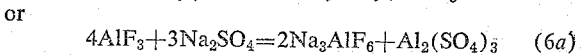

$$4AlF_3 + 3Na_2SO_4 = 2Na_3AlF_6 + Al_2(SO_4)_3 \quad (6a)$$

The use of a crystalline sodium salt is particularly advantageous to my process, not only because it does not increase the size of equipment necessary to precipitate and filter off the cryolite produced, but also because one product of the reaction is a soluble aluminum salt which in Reaction 6 is shown as aluminum chloride. It is desirable that substantially no residual NaCl remains in solution, and it is also desirable that the solution from which cryolite is precipitated contain free acid, such as HCl, whereby impurities such as iron and phosphate remain in solution. The elimination of NaCl and the presence of free acid are assured by the addition, after cryolite formation of a small amount of $H_2SiF_6$:

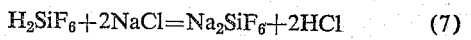

$$H_2SiF_6 + 2NaCl = Na_2SiF_6 + 2HCl \quad (7)$$

In this way fluorine economy is attained by the production of cryolite from the residual $AlF_3$ remaining after recovery of the $AlF_3.3H_2O$ but also there is produced the catalyst used in the Reaction 1 between alumina and fluosilicic acid and that this catalytic agent is formed from inexpensive sodium chloride rather than from much more costly hydrochloric acid and alumina.

There is now returned a portion of this aluminum chloride solution to dilute new fluosilicic acid for production of new aluminum fluoride solution in Reaction 1. Thus, a portion of the aluminum chloride solution is discarded (a) as a means of eliminating impurities which normally exist in fluosilicic acid produced in making fertilizers from phosphate rock (the common source of $H_2SiF_6$), and (b) as a means of eliminating excess water from the system, thereby removing the need for evaporators and costly evaporation to remove water. It is preferred to reuse about 50 percent and to discard approximately 50 percent of the by-product aluminum chloride solution of Reaction 6 but the quantity to be reused is determined by the quantity which can be added to the original fluosilicic acid (normally between 18 and 23 percent $H_2SiF_6$) to result in a concentration of 8 to 15 percent $H_2SiF_6$. Within this range of concentration of $H_2SiF_6$ the alumina in the aluminum chloride solution reused will be sufficient to react with 2 to 5 percent of the total $H_2SiF_6$ as in Reaction No. 3.

The exact conditions under which the invention may be practiced will depend upon the concentrations of the solutions employed and upon the facilities available. The following example illustrates the manner in which the process is preferably applied. To a fluosilicic acid solution containing 20 percent $H_2SiF_6$, there was added aluminum chloride sufficient to combine with 4 percent of the fluosilicic acid together with water sufficient to dilute the fluosilicic acid to 12 percent $H_2SiF_6$. The resulting solution was then heated to 125° F. to 130° F. and aluminum hydrate was added sufficient to combine with 100 percent of the fluosilicic acid. The temperature, increased by the heat of the reactions, was rapidly adjusted to between 170° F. and 175° F. by the application of slight additional heat and maintained at this temperature for 15 minutes. The temperature was then reduced rapidly to 160° F. by the rapid addition of a dilute solution of aluminum chloride containing an amount of aluminum chloride necessary to react with between 1 and 2 percent of the original fluosilicic acid. The insoluble silicic acid [$Si(OH_4)$] was then filtered off and the filtrate was found to contain 98 percent of the original fluorine and 95 percent of the total alumina added as aluminum hydrate and aluminum chloride. The aluminum fluoride solution was then seeded with aluminum fluoride crystals in an amount equal to 50 percent of the aluminum fluoride in solution and the slurry was heated to between 190° F. and 205° F. for a period of four hours while the slurry was being continuously agitated. The aluminum fluoride trihydrate crystals were then filtered off. The filtrate contained 1.9 percent soluble aluminum fluoride and the filter cake removed contained 85.5 percent of the originally soluble aluminum fluoride plus that added as a seed. This aluminum fluoride trihydrate was heated at, e.g., 500° to 600° F. with about 10 percent by weight of aluminum trihydrate, to combine with any HF given off in heating, to remove the combined water. The dehydrated aluminum fluoride contained 88 percent $AlF_3$, 10.5 percent $Al_2O_3$, and only a trace of $SiO_2$.

To the filtrate obtained after filtering off the aluminum fluoride crystals, an amount of sodium chloride was added sufficient to combine with substantially 100 percent of the aluminum fluoride in solution (Reaction 6), and a small amount of $H_2SiF_6$ was added to ensure elimination of NaCl and the presence of free acid as described above. The mixture was heated to 175° F. and the precipitated cryolite was filtered off and dried. The filtrate containing principally aluminum chloride and substantially no sodium chloride was then used, in part, to supply the aluminum chloride needed to catalyze Reaction 1 between alumina and fluosilicic acid.

Although the invention has been described by way of example with reference to aluminum hydrate, hydrofluosilicic acid, and aluminum chloride it will be understood from what has been said that other low iron alumina sources, other fluorine acids, such as HF, and other soluble aluminum accelerator salts, such as aluminum sulfate, may be used in similar fashion and with similarly desirable results in practicing the invention. Likewise, it will be understood that although there has been described the addition to the $H_2SiF_6$ of an aluminum salt equivalent to 2 to 5 percent $H_2SiF_6$ followed by an amount of aluminum hydrate substantially equal to that needed to react with the $H_2SiF_6$, the amounts of aluminum salt and aluminum hydrate may be varied, the important thing being that the total of the salt and the hydrate is in excess of the $H_2SiF_6$.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. In a process of making aluminum fluoride in which an aluminous material is reacted at at least 150° F. with a fluorine-containing acid of the group consisting of hydrofluoric acid and hydrofluosilicic acid the steps of (1) providing an aqueous solution of said acid, adding a soluble aluminum salt, other than the fluoride, thereto and heating the solution to between 110° and 135° F., (2) adding aluminum hydrate in an amount substantially equivalent to said acid and bringing the solution rapidly to about 160° to 190 F., (3) then cooling the solution rapidly to below about 160° F., (4) filtering the resultant reaction mixture to remove insoluble silica and any concomitant impurities, (5) adding to the filtrate a solid seed material inert thereto and heating to precipitate insoluble aluminum fluoride trihydrate, and (6) filtering and recovering the granular insoluble trihydrate.

2. A process according to claim 1 in which said soluble aluminum salt is added in an amount equivalent to about 2 to 5 percent of the $H_2SiF_6$.

3. A process according to claim 1, said solid inert seed material being aluminum fluoride.

4. A process according to claim 1 in which the filtrate and solid material of step (5) is heated to about 190° to 205° F.

5. In a process of making aluminum fluoride in which an aluminous material is reacted at at least 150° F. with a fluorine-containing acid of the group consisting of hydrofluoric acid and hydrofluosilicic acid the step of (1) providing an aqueous solution of said acid, adding a soluble aluminum salt, other than the fluoride, thereto and heating the solution to about 110° to 135° F., (2) adding aluminum hydrate in an amount substantially equivalent to said acid while bringing the solution rapidly to about 165° to 175° F. for about 15 to 30 minutes, (3) then cooling the solution rapidly to below about 160° F., (4) filtering the resultant reaction mixture to remove insoluble silica and any concomitant impurities, (5) adding to the filtrate a solid seed material inert thereto and heating to about 190° to 205° F. to precipitate insoluble aluminum fluoride trihydrate, (6) filtering and recovering the granular insoluble trihydrate, (7) treating the filtrate with a soluble sodium salt in solid form and thereby forming cryolite, and (8) filtering the cryolite from the solution.

6. A process according to claim 5 in which a portion of the filtrate from step (8) is returned to step (1) to supply said aluminum salt.

7. In a process of making aluminum fluoride in which an aluminous material is reacted at at least 150° F. with fluosilicic acid, the steps of (1) providing an aqueous solution of said acid, adding a soluble aluminum salt thereto, other than the fluoride, in an amount equivalent to about 2 to 5 percent of $H_2SiF_6$ and heating the solution to about 110° to 135° F., (2) adding aluminum hydrate in an amount substantially equivalent to said acid, (3) then heating rapidly to about 175° F. for about 15 minutes, (4) then cooling the solution rapidly to below about 160° F., (5) filtering the resultant reaction mixture to remove insoluble silica and any concomitant impurities, (6) adding to the filtrate aluminum fluoride as seed and heating to about 190° to 205° F. for about 4 hours to precipitate insoluble aluminum fluoride trihydrate, (7) filtering and recovering the granular insoluble trihydrate, (8) treating the filtrate with a soluble sodium salt in solid form and thereby forming cryolite, (9) filtering the cryolite from the solution, and (10) returning a portion of the filtrate from step (9) to step (1).

8. A process according to claim 7, the amount of $AlF_3$ added to step (6) being about half the amount of soluble $AlF_3$ present in the filtrate.

9. In a process of making aluminum fluoride in which an aluminous material is reacted with fluosilicic acid, the steps of (1) providing an aqueous solution of said acid, adding a soluble aluminum salt, other than the fluoride, thereto and heating the solution to about 110° to 135° F., (2) adding alumina in an amount substantially equivalent to said acid and bringing the solution rapidly to about 160° F. to 175° F. for about 15 to 30 minutes, (3) then cooling the solution rapidly to below about 160° F., (4) filtering the resultant reaction mixture to remove insoluble silica and any concomitant impurities, (5) adding to the filtrate a solid seed material inert thereto and heating to about 190° to 205° F. to precipitate insoluble aluminum fluoride trihydrate, and (6) filtering and recovering the granular insoluble trihydrate.

10. In a process of making aluminum fluoride in which an aluminous material is reacted at at least 150° F. with a fluorine-containing acid of the group consisting of hydrofluoric acid and hydrofluosilicic acid the steps of (1) providing an aqueous solution of said acid, adding a soluble aluminum salt, other than the fluoride, thereto and heating the solution to between 110° and 135° F., (2) adding aluminum hydrate in an amount substantially equivalent to said acid while bringing the solution rapidly to about 160° to 175° F., (3) filtering the resultant reaction mixture to remove insoluble silica and any concomitant impurities, (4) adding to the filtrate a solid seed material inert thereto and heating to about 190° to 205° F. to precipitate insoluble aluminum fluoride trihydrate, and (6) filtering and recovering the granular insoluble trihydrate.

11. In a process of making aluminum fluoride in which an aluminous material is reacted at at least 150° F. with hydrofluosilicic acid, the steps of (1) providing an aqueous solution of said acid, adding aluminum chloride equivalent to about 5 to 10 percent of said acid and heating the solution to about 110° to 135° F., (2) adding aluminum hydrate, $Al_2O_3 \cdot 3H_2O$, in an amount equal to about 95 percent of said acid, (3) then heating, if need be, to about 160° to 190° F. for about 5 to 30 minutes, (4) then cooling the solution rapidly to below about 160° F., (5) filtering the resultant reaction mixture to remove insoluble silica and any concomitant impurities, (6) adding to the filtrate aluminum fluoride as seed in an amount about equal to the aluminum fluoride in the solution and heating to at least 190° F. for about 4 hours to precipitate insoluble aluminum fluoride trihydrate, and (7) filtering and recovering the granular insoluble aluminum fluoride trihydrate.

12. A process according to claim 5 in which a small amount of $H_2SiF_6$ is added after the cryolite is formed in step (7) and before filtration of the cryolite in step (8).

References Cited by the Examiner
UNITED STATES PATENTS

| | | | |
|---|---|---|---|
| 1,475,158 | 11/23 | Howard | 23—88 |
| 1,797,994 | 3/31 | Morrow. | |
| 2,021,601 | 11/35 | Hilscher et al. | 23—88 |
| 2,186,433 | 1/40 | Schwemmer | 23—88 |
| 2,842,426 | 7/58 | Glocker | 23—88 |

OTHER REFERENCES

Mellor: Comprehensive Treatise on Inorganic and Theoretical Chemistry, volume 6, pages 947–8 (1925), Longmans, Green and Company, New York.

MAURICE A. BRINDISI, *Primary Examiner.*
GEORGE D. MITCHELL, *Examiner.*